United States Patent
Stone et al.

[11] Patent Number: 5,146,492
[45] Date of Patent: Sep. 8, 1992

[54] ANTI-EXPLOSIVE RETURN COIN DISCHARGE UNIT FOR THE CABINET OF A COIN OPERABLE TELEPHONE

[76] Inventors: Steve Stone, 220-58 75th Ave.; Steve Fama, 75-12 Springfield Blvd., both of Bayside, N.Y. 11364

[21] Appl. No.: 732,160

[22] Filed: Jul. 18, 1991

[51] Int. Cl.⁵ .................................... H04M 17/00
[52] U.S. Cl. .................................. 379/145; 379/437; 194/202; 194/351; 232/57.5
[58] Field of Search .............. 379/145, 146, 437, 450, 379/451; 194/202, 351; 232/57.5, 58

[56] References Cited
U.S. PATENT DOCUMENTS

| | | | |
|---|---|---|---|
| 2,288,222 | 6/1942 | Bockstein | 232/58 |
| 2,336,780 | 12/1943 | Dunn | 194/351 |

*Primary Examiner*—Stafford D. Schreyer
*Attorney, Agent, or Firm*—Nicholas J. Garofalo

[57] ABSTRACT

A return coin discharge unit mountable in the box cabinet of a coin operable telephone apparatus has an entry opening into which return coins from the apparatus will drop and it includes a ramp in a passage down which ramp the dropped coins will slide and issue through a horizontal slot at a front end of the unit. An open ended trough having a curved inner bottom surface located on the ramp below the entry opening serves to cause dropped coins moving over its curved surface to obtain horizontal positions for sliding down the ramp. And, a flap gate pivoted in the passage and inclined forwardly with its bottom edge resting upon the ramp functions to allow one coin at a time to pass beneath it to the exit slot. Explosives and blocking material are prevented by the narrow horizontal slot against entry into the unit; and the gate curbs the extent to which damaging wires may be inserted through the slot into the unit.

8 Claims, 2 Drawing Sheets

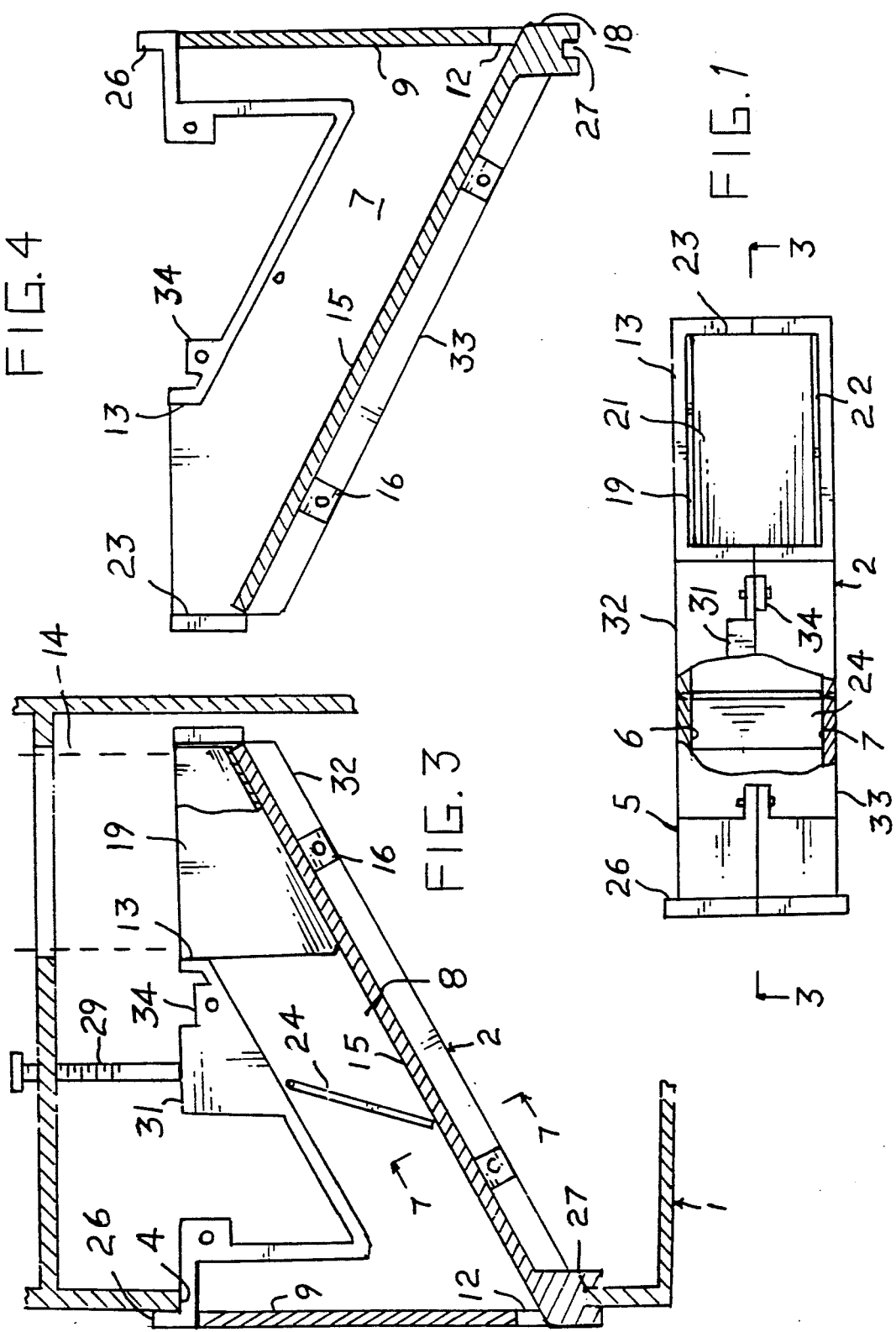

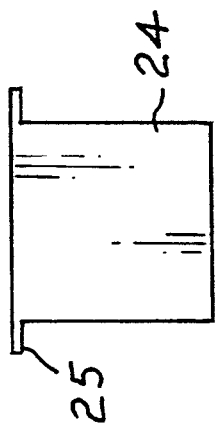
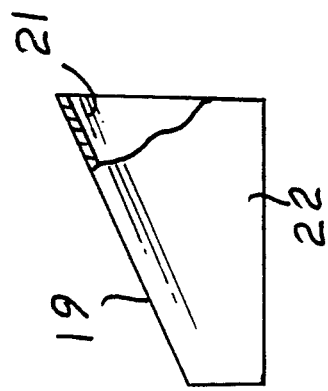
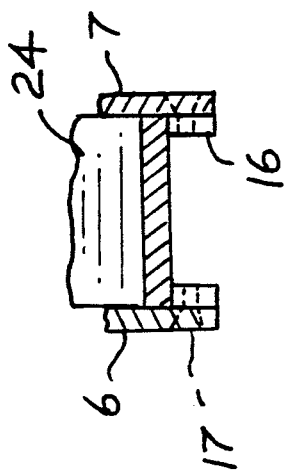
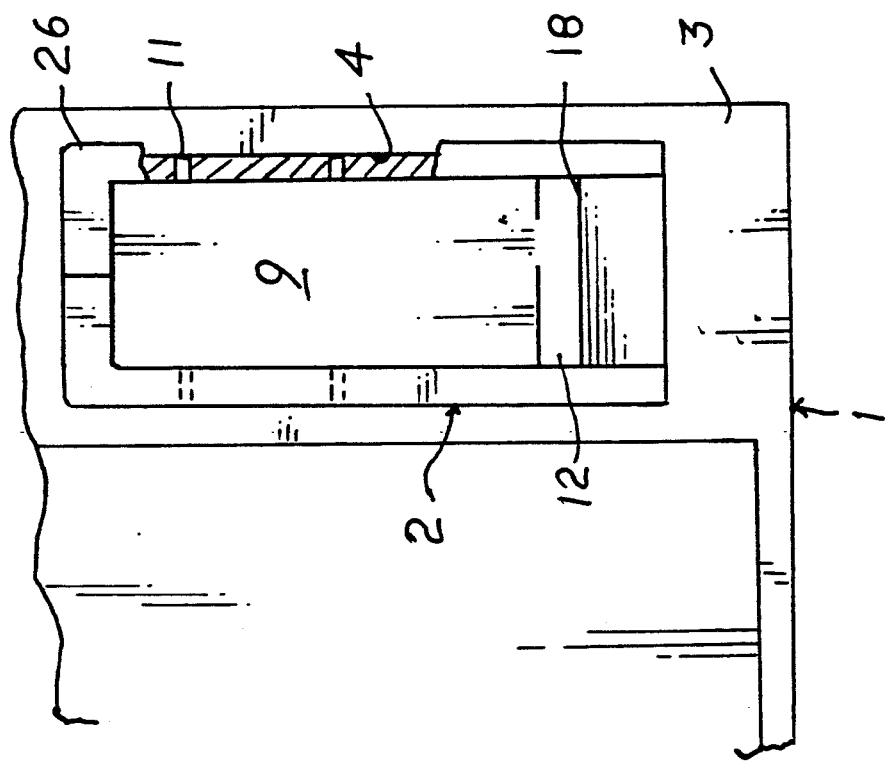

ANTI-EXPLOSIVE RETURN COIN DISCHARGE UNIT FOR THE CABINET OF A COIN OPERABLE TELEPHONE

BACKGROUND OF THE INVENTION

This invention is directed to providing for a conventional coin operable telephone apparatus improved coin return means. More particularly, it is directed to providing for such apparatus a return coin discharge unit as a replacement for the conventional finger accessible return coin receptical and which is such that it is anti-explosive.

Coin operable telephones are necessary to make available to the general public ready means for making a phone call, and particularly for summoning help in cases of fire, the need of police or an ambulance. However, question arises as to the need of limiting the number of such public phones because of vandalism causing their destruction or loss of their coins. Vandals often accomplish this by inserting explosives or blocking material into the coin return receptacle.

The general object of this invention is to provide a return coin discharge unit adapted to be assembled in conventional manner in a coin operable telephone apparatus, and which is not subject to the vandalism indicated.

A further object of the invention is to provide such a unit which is simple in structure, inexpensive to manufacture, and practical for the purposes intended.

BRIEF SUMMARY OF THE INVENTION

The invention provides a return coin discharge unit adapted to be mounted into the box cabinet of a coin operable telephone apparatus. The unit includes a housing having a coin flow passage through it in which is mounted an inclined ramp. One end of the ramp is located beneath a tubular inlet that is registrable with a return coin chute of the phone apparatus, and the other end of the ramp projects through a coin exit slot at a front end of the unit. An open-ended trough of U-form having a curved inner bottom surface is positioned on the ramp beneath the inlet, whereby a coin dropped from the chute and inlet will obtain a horizontal or flat condition as it moves over the curved surface of the trough. It will then slide freely down the ramp and issue through the exit slot. To avoid possible piling at the exit slot of several coins that may have been dropped in close succession onto the ramp, a flap gate is provided. It is pivoted above the ramp between opposed walls of the coin passage. It is adapted to control movement of one coin at a time down the ramp to the exit slot, and it also serves to avoid projection of a wire through the slot beyond the gate to the telephone apparatus. The unit is adapted to be retained in the cabinet of the telephone apparatus against removal from the outside. To this end, it is formed with shoulder and neck means engageable with the front wall of the cabinet, and by a lug on the unit which is subject to downward pressure of screw means within the cabinet.

BRIEF DESCRIPTION OF THE DRAWING

In the accompanying drawing:

FIG. 1 is a plan view of a return coin discharge unit embodying the invention, a center portion of the housing being broken away to disclose the flap gate;

FIG. 2 is a front view of a lower portion of a conventional box cabinet of a coin operable telephone apparatus and shows the unit of the present invention as mounted in the cabinet;

FIG. 3 is a sectional view of the line 3—3 of FIG. 1, and shows the unit mounted in the cabinet of the telephone apparatus;

FIG. 4 is a view of a section of the unit complementary to that shown in FIG. 3;

FIG. 5 is a plan view of the flap gate;

FIG. 6 is a side elevation view of the trough turned bottom side up; and

FIG. 7 is a section on line 7—7 of FIG. 3.

DETAILED DESCRIPTION OF THE INVENTION

Reference is now directed to the drawing, wherein there is shown (FIGS. 2, 3) the lower portion of the box cabinet 1 of a conventional coin operable telephone apparatus in which a separable return coin discharge unit 2 embodying the invention is mounted. Only so much of the telephone apparatus is shown as will enable a clear understanding of the invention, its use and its need.

The cabinet has a front wall 3 provided with a vertically elongated rectangular opening 4 to the interior of the cabinet. The present invention which improves over the conventional return coin receptical in structure, use and security against vandalism, is a return coin discharge unit 2 (FIG. 1). It is shown (FIGS. 2, 3) as mounted in the opening 4 and securely retained within the cabinet in conventional manner against removal from the outside.

The unit 2 embodying the invention includes a housing 5 having a pair of parallel opposed side walls 6, 7 between which is an inclined oblong return coin passage 8. A wall 9 of the unit extending across the front end of the passage and fixed in place by pins 11 projecting from its sides into the side walls, closes the front end of the passage except for a narrow horizontal slot 12 below the wall. The slot serves as an exit for any return coins dropped into the coin passage through a rectangular entry tube 13 extending upwards from a rear top end of the housing. In the assembled condition of the unit within the cabinet 1 of the telephone apparatus the entry tube sleeves about a lower end of a conventional return coin chute 14 (FIG. 3, broken line) located within the cabinet of the telephone apparatus.

A ramp 15 provides a floor to the coin passage. Return coins dropped into the passage will slide down the ramp and issue out of the exit slot 12 at the front of the unit. The ramp is an inclined elongated rectangular plate having a position in the unit in which its longitudinally extending sides abut the side walls 6, 7 (FIGS. 1, 7). The ramp is retained in position by means of lugs 16 depending from opposite sides of the ramp and fastened by screws 17 to the side walls.

The forward end of the ramp terminates in a nose 18 which projects through the exit slot and curves downward. The space of the slot remaining above the nose of the ramp is horizontal and narrow in depth but slightly greater than the thickness of a dime, nickel or quarter coin so as to allow these coins when sliding down the ramp to exit freely through the slot. The face of the rear area of the ramp is spaced below the entrance to the entry tube 13. The ramp, besides serving as a floor that closes over the bottom of the coin passage 8, also serves as a bottom wall to the housing.

It has been found that if a coin dropped through the entry tube into the coin passage were to roll and not slide down the ramp, it would very likely not slide through the horizontal exit slot but would obtain an upright condition abutting the interior face of the front wall 9 of the housing. One or more coins obtaining such condition would block the exit slot and cause clogging of the coin passage. To avoid happening of this condition, means is provided to cause coins dropped into the coin passage through the entry tube to obtain a flat or level position allowing them to slide down the ramp and pass through the exit slot. To this end, a trough 19 of a general U-form having a curved inner bottom surface 21 is provided.

The trough is of relatively thin metal. It rests below the entrance to the coin passage upon the rear surface of the ramp. It has opposed side walls 22 and it is open in its top, forward and rear ends. Its side walls line rear portions of the side walls 6, 7 of the coin passage; and its open top area registers with the tubular entrance to the unit. Upper forwardly extending edges of the trough's side walls abut corresponding areas of the tubular entrance 13, and the side walls of the trough taper downwardly from the rear to define rear edges which abut a back wall 23 of the tubular entrance. While the close abutting disposition of the trough within the coin passage is adequate to retain it in position, however, suitable means such as a glue is applied to securely ensure the trough in place.

It can be seen that as a coin is dropped from the return coin chute 14 of the telephone apparatus into the tubular entrance of the unit, it will in moving over the curved inner surface of the trough obtain a horizontal or flat position as it moves from the trough onto the ramp. It will then slide down the ramp and freely issue through the exit slot.

Further, at times several return coins may in close succession be dropped from the chute 14 and move from the trough onto the ramp. To avoid any possibility of the coins, as they slide down the ramp, piling up at the exit slot and blocking their issuance through the slot, appropriate means is provided. This means is a quadratic plate or flap gate 24 (FIG. 5) of stiff material. It is pivoted between the side walls of the passage by a pair of pins 25 extending from opposite sides of its upper end. Its length is such that it extends angularly and forwardly in the coin passage and rests its bottom edge upon the ramp, as appears in FIG. 3. The gate is preferably located about midway of the coin passage. As a coin slides down the ramp it will, upon engaging the gate, push it forwardly and pass under it to the exit slot. And, when a group of coins in close succession slide down the ramp, they will be guarded by the gate from moving more than one at a time beyond the gate to the exit slot.

As earlier mentioned, the unit embodying the invention is designed to be mounted in the rectangular opening 4 of the cabinet of a conventional coin operable telephone apparatus; and it is intended that it be securely retained therein in a manner preventing its removal from the outside by vandals. To this end, the housing of the unit terminates at its forward end in a shoulder 26 extending about its vertical sides and top. When the unit is entered into the cabinet 1, the shoulder abuts the outside border of the opening 4; and a neck 27 defined by a groove across a thickened back of the nose 18 of the ramp engages over a lower edge of the opening. Within the cabinet a screw 29 (FIG. 3) actuable from the interior of the cabinet is adapted to be pressured down against an underlying lug 31 extending up from the unit. When so mounted in the cabinet, the unit is securely retained in place against removal from the outside. And, what is of considerable advantage of the unit, its narrow coin exit slot 12 avoids the practice of vandals entering explosives into the unit or clogging the coin passage. And, it can be seen that the poking of a wire by vandals through the slot will be blocked by the gate from moving further into the unit.

While the housing of the unit may take various forms, it is shown as having a pair of complementary shells 32, 33 adapted to be secured to each other by screws engaging complementary lugs 34 extending from each of the shells.

Further, in lieu of a pair of shells forming the housing, one shell may be provided having sufficient depth to accommodate the ramp, flap gate and trough, and adapted to be covered over by a complementary side plate.

While an embodiment of the invention has been illustrated and described in detail, it is to be expressly understood that the invention is not limited thereto. Various changes of form, design or arrangement may be made in its components without departing from the spirit and scope of the invention. It is our intent, therefore, to claim the invention not only as shown and described but also in all such forms and modifications or equivalents thereof as may be reasonably construed to be within the spirit of the invention and the scope of the appended claims.

What is claimed is:

1. A return coin discharge unit comprising a housing having a coin entry opening in a top rear area thereof and a horizontal coin exit slot beneath a front wall thereof, a flat surfaced ramp in the housing having a high rear end spaced below the entry opening and a low forward end extending through the slot, and a trough of U-form seated on the high rear end of the ramp having a curved inner bottom surface below the entry opening, the entry opening being adapted to have a coin dropped through it onto the curved surface of the trough, the trough being adapted to cause the coin as it moves over its curved surface to obtain a horizontal position, and the ramp being adapted to allow the coin to slide down its surface from the trough and exit through the slot; wherein the housing has a pair of laterally spaced side walls between which the ramp extends, the entry opening is adapted to have a multiple number of coins dropped in succession through it onto the curved surface of the trough for movement down the ramp, and a flap gate is pivoted at its upper sides between the side walls and is inclined forwardly with a bottom end thereof resting upon the ramp, the gate being adapted to allow sliding of one coin at a time beyond it to the slot.

2. A return coin discharge unit comprising a housing having a coin entry opening in a top rear area thereof and a horizontal coin exit slot beneath a front wall thereof, a flat surfaced ramp in the housing having a high rear end spaced below the entry opening and a low forward end extending through the slot, and a trough of U-form seated on the high rear end of the ramp having a curved inner bottom surface below the entry opening, the entry opening being adapted to have a coin dropped through it onto the curved surface of the trough, the trough being adapted to cause the coin as it moves its curved surface to obtain a horizontal position, and the ramp being adapted to allow the coin to slide down its surface from the trough and exit through the slot;

wherein the housing has a pair of laterally spaced side walls between which the ramp extends, the front wall is at right angles to the side walls, the unit is adapted to be entered into a complementary opening of the box cabinet of a conventional coin operable telephone apparatus, and means is provided on the housing which is engageable with means of the cabinet whereby the unit is caused to be retained in the cabinet.

3. A return coin discharge unit comprising a housing having a coin entry opening in a top rear area thereof and a horizontal coin exit slot beneath a front wall thereof, a flat surfaced ramp in the housing having a high rear end spaced below the entry opening and a low forward end extending through the slot, and a trough of U-form seated on the high rear end of the ramp having a curved inner bottom surface below the entry opening, the entry opening being adapted to have a coin dropped through it onto the curved surface of the trough, the trough being adapted to cause the coin as it moves over its curved surface to obtain a horizontal position, and the ramp being adapted to allow the coin to slide down its surface from the trough and exit through the slot; wherein the housing has a pair of laterally spaced side walls between which the ramp extends, the front wall is at right angles to the side walls, the unit is adapted to be entered into a complementary opening of the box cabinet of a conventional coin operable telephone apparatus, the housing has a shoulder extending about the top and sides of the front wall adapted when the unit is entered into the opening to abut complementary areas of a front wall of the cabinet, the housing has a laterally extending groove at the bottom of a front end thereof adapted to engage over a complementary edge of the opening of the cabinet, and the housing has a lug intermediately of a top surface thereof adapted to be subjected to pressed engagement by a screw within the cabinet, whereby the unit is adapted to be retained within the cabinet.

4. A return coin discharge unit comprising a housing having a vertical front wall, laterally spaced side walls, and a flat surfaced rectangular bottom wall inclined forwardly and downwardly between the side walls, the bottom wall having a forward end extending below the front wall, there being a narrow horizontal slot spacing the forward end of the bottom wall below the front wall, the housing having at a rear top area thereof an entry opening below which a rear end area of the bottom wall extends, a trough of U-form seated upon the rear end area of the bottom wall and having a curved inner bottom surface registering with the entry opening, and the curved surface of the trough being adapted to cause a coin dropped onto it from the entry opening to obtain a horizontal condition as the coin moves over the curved surface, and the surface of the bottom wall defining a ramp having an angle of inclination to cause the coin to slide from the trough down the surface of the ramp and exit from the housing through the slot.

5. A return coin discharge unit as in claim 4, wherein intermediately of the ends of the ramp a flap gate is pivoted at its upper sides between the side walls, the gate is inclined forwardly and has a bottom end resting upon the surface of the ramp, the gate being responsive to being abutted by a coin sliding down the ramp to pivot upwardly to allow the coin to pass under it toward the slot.

6. A return coin discharge unit as in claim 5, wherein the unit is adapted to be mounted in the cabinet of a coin operable telephone apparatus in such manner that its entry opening registers with a coin return chute of the telephone apparatus.

7. A return coin discharge unit as in claim 6, wherein means is provided for retaining the unit in the cabinet against removal of the unit from the outside of the cabinet.

8. A return coin discharge unit comprising a housing having a coin entry opening in a top rear area thereof, a pair of laterally spaced side walls, a flat surfaced ramp between the side walls, the ramp having a high rear end spaced below the entry opening and a low forward end spaced with a narrow clearance below the front wall, the clearance defining a horizontal slot, the entry opening being adapted to have a coin dropped through it onto the ramp, and the ramp being adapted to allow the coin to slide down its surface and exit through the slot, wherein a flap gate is pivoted at its upper sides between the side walls and is inclined forwardly with a bottom end thereof resting upon the surface of the ramp, the gate being pivotable forwardly upon being pushed forwardly from its rear by a coin sliding down the ramp to allow the coin to slide beneath it toward the slot.

* * * * *